United States Patent [19]

Smick

[11] Patent Number: 4,522,291

[45] Date of Patent: Jun. 11, 1985

[54] SEED FLOW DIVIDER ATTACHMENT FOR SEED DRILLS

[76] Inventor: D. Neal Smick, Box 158, Connell, Wash. 99326

[21] Appl. No.: 508,027

[22] Filed: Jun. 27, 1983

[51] Int. Cl.³ .............................................. B65G 11/00
[52] U.S. Cl. .................................. 193/23; 193/31 A; 111/34; 111/86
[58] Field of Search .................... 111/1, 34, 86, 73, 80; 193/21, 23, 2 A, 9, 20, 31 A; 406/182; 137/874; 222/485, 486

[56] References Cited

U.S. PATENT DOCUMENTS

| | | | |
|---|---|---|---|
| 872,363 | 12/1907 | McQuire | 111/80 |
| 904,410 | 11/1908 | Collins | 111/80 |
| 993,183 | 5/1911 | McQuire | 111/59 |
| 1,075,668 | 10/1913 | Reeder | 111/80 |
| 1,229,604 | 6/1917 | Garst | 111/80 |
| 1,291,164 | 1/1919 | Royer | 111/80 |
| 1,342,456 | 6/1920 | Nagel | 193/21 X |
| 1,362,834 | 12/1920 | Barfield | 111/80 |
| 1,591,793 | 6/1926 | Stephens | 111/80 |
| 3,398,707 | 8/1968 | McClenny | 111/85 |

FOREIGN PATENT DOCUMENTS 397149 2/1974 U.S.S.R. ................... 111/80

Primary Examiner—Robert A. Hafer
Assistant Examiner—Danton DeMille
Attorney, Agent, or Firm—Wells, St. John & Roberts

[57] ABSTRACT

An attachment for seed drills whereby a fraction of seed flow can be selectively diverted from an existing flow path to a secondary flow path and in which the diverted percentage of the seed flow can be delivered to a planting depth different from that set at the level of an existing planting shoe. Two levels of seed can be planted simultaneously. A valve mechanism is also provided to selectively guide seed flow either completely through the primary, existing discharge tube and shoe, or to be divided with a selected percentage flowing through the existing discharge tube and the remainder being directed through the secondary or auxiliary tube.

20 Claims, 7 Drawing Figures

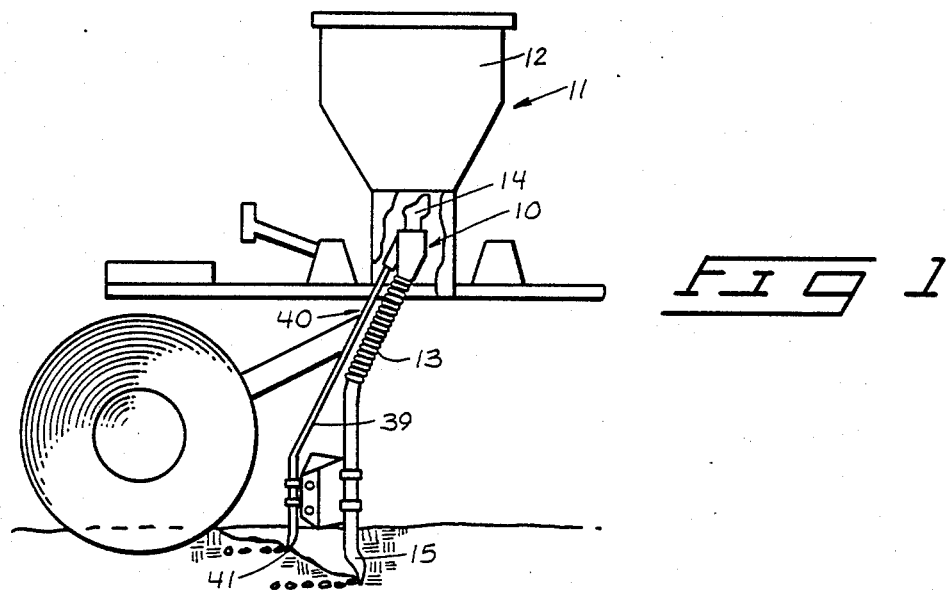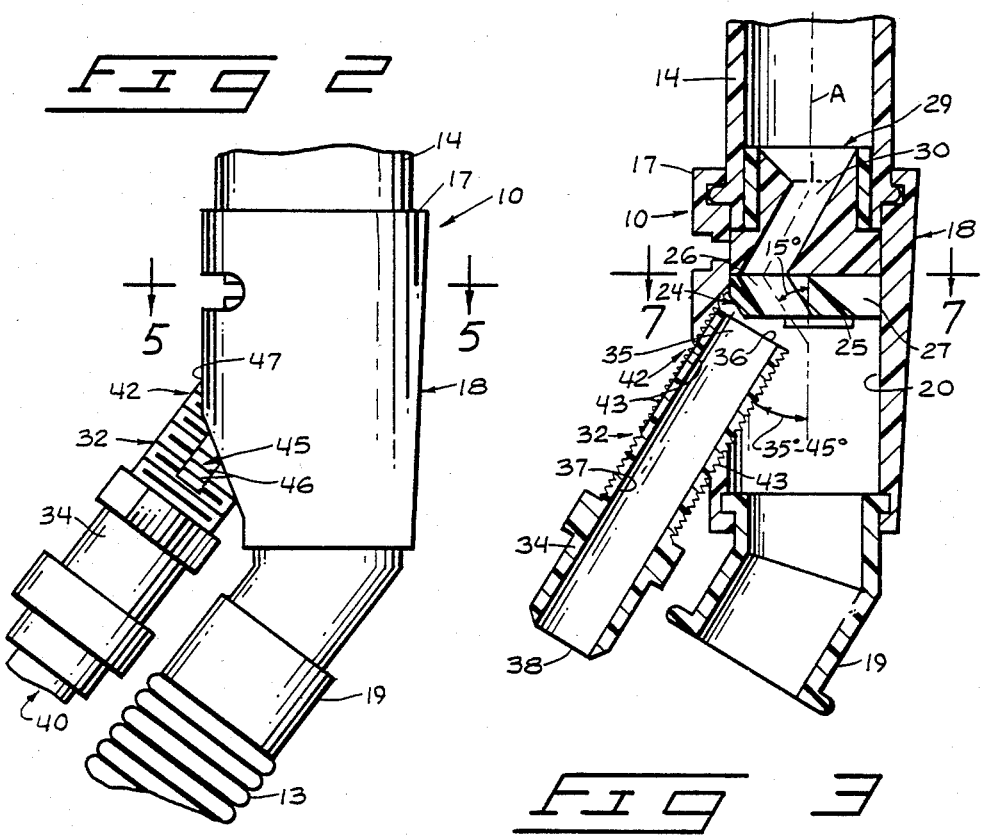

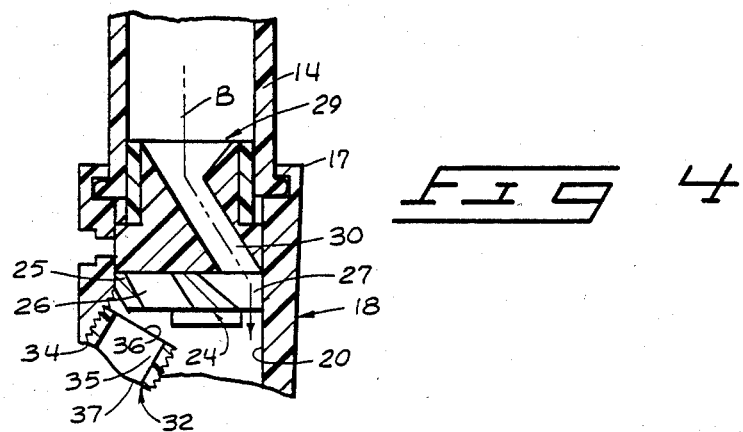
FIG 4
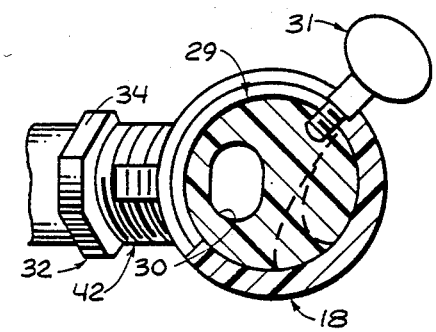
FIG 5
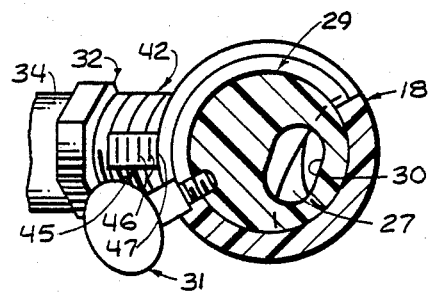
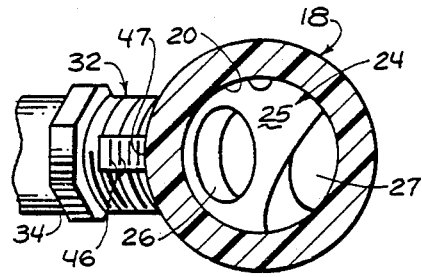
FIG 6    FIG 7

SEED FLOW DIVIDER ATTACHMENT FOR SEED DRILLS

FIELD OF THE INVENTION

The present invention is related generally to selective division of seed flow in an agricultural seed drill from a hopper to primary and secondary discharge tubes.

BACKGROUND OF THE INVENTION

It often has become desirable to plant seeds at varying levels beneath the ground surface due to the inability to predict weather during germination and early growth stages. Seeds planted deeply, in certain weather conditions, will fail to reach the ground surface. Likewise, as a result of weather conditions, seeds planted close to the ground surface can be adversely affected by cold or extremely rainy weather in which early germinating seeds are killed by frost or, in some instances, even washed away.

Conventional seed drills include adjustments that facilitate selective planting depths. However, a substantial amount of time is involved in setting the individual seed planting "boots" of conventional seed drills at the selected soil depth. Furthermore, once the depth is set all the seed is planted at the same depth. Therefore, seeds planted too deep and affected by adverse weather conditions, will fail to grow. The affected area must then be re-seeded at a shallower depth or the entire affected area will pass through the growing and harvest season without producing.

It is desirable to obtain some form of attachment that will mount to existing seed drills to afford the capability of separating seed flow from a hopper and planting the seed with a selected percentage of seed at one level and the remainder at another level, thereby assuring germination and growth of seeds planted at least at one of the planting levels.

Apparatus have been developed for delivering seeds at different bedding levels from the same drill. Some designs receive seeds from individual hoppers, with each hopper delivering to its own delivery tube.

An exception to the above multi-hopper planting arrangement is disclosed in U.S. Pat. No. 1,362,834 to H. B. Barfield. Barfield discloses a cotton planter in which a single hopper delivers to a bifurcated seed delivery tube. At the vertex of the tube bifurcations is a flap that can be pivoted to cover one or the other seed tubes. Mechanism is attached to the flap to alternately operate it to shift one direction or the other to alternately drop seeds through the bifurcated tubes. One hundred percent seed flow is thus alternated between the bifurcated tubes, leaving a succession of unplanted spaces between groups of planted seeds.

U.S. Pat. No. 1,229,604 is exemplary of a planter in which two individual hoppers are used with associated delivery tubes for directing seed, or a combination of seed and fertilizer at selected levels. Other efforts have resulted in planters in which single hoppers deliver to a pair of seed delivery tubes rather than a single tube. By providing a pair of tubes leading from a single hopper, the user is able to selectively plant at two or more depths. This arrangement may very well be serviceable but requires the purchase of a drill having such capabilities.

Patents disclosing examples of multiple seed delivery tubes extending from single hoppers are: U.S. Pat. Nos. 1,075,668; 993,183; 904,410; 872,363; 1,591,793; 1,291,164; and 3,398,707.

BRIEF DESCRIPTION OF THE DRAWINGS

A preferred form of the present invention is illustrated in the accompanying drawings in which:

FIG. 1 is a diagrammatic view illustrating the present attachment mounted to an existing form of conventional seed drill;

FIG. 2 is an enlarged detail view of the present attachment;

FIG. 3 is a longitudinal section view of the present attachment;

FIG. 4 is a fragmented sectional view illustrating a different operational position of elements within the present attachment than that shown in FIG. 3;

FIG. 5 is a cross-sectional view taken substantially along the line 5—5 in FIG. 2 with the elements shown in positions corresponding to the relative positions shown in FIG. 3;

FIG. 6 is a view similar to FIG. 5 only showing a different operational position of the elements illustrated therein corresponding to the relative positions of elements shown in FIG. 4; and FIG. 7 is a cross-sectional view taken substantially along line 7—7 in FIG. 3.

DETAILED DESCRIPTION OF A PREFERRED EMBODIMENT

In compliance with the constitutional purpose of the Patent Laws "to promote the progress of science and useful arts" (Article 1, Section 8), applicant submits the following disclosure of the invention.

A seed flow divider attachment is generally indicated in the accompanying drawings by the reference numeral 10. The present attachment 10 is specifically designed to be mounted to an existing conventional seed drill 11. The seed drill 11 must include a hopper 12 for storing and delivering metered quantities of seed to a seed delivery tube 13. The tube 13 is typically connected to a seed cup 14 situated at the bottom of the hopper. Seed is delivered through the tube 13 to a boot 15 situated at an adjusted seed and planting level in relation to the ground surface. The present attachment will mount between the existing seed delivery tube 13 and the existing seed cup 14.

It is understood that the seed hopper of a conventional seed drill typically feeds a plurality of seed cups and delivery tubes along the transverse width of the implement. It is therefore intended that a single flow divider attachment 10 be provided for each seed cup 14 and associated seed delivery tube 13. The discussion following speaks in terms of a single delivery tube 13 and seed cup 14, though it is understood that a number of such cups and tubes will typically be involved. Operation of the several cup and tube assemblies is identical and description of one will serve as description of all.

The present attachment is illustrated in particular detail in FIGS. 2-7. As shown, the attachment includes a hollow insert 18. An upper end 17 of the hollow insert 18 is adapted for attachment to the seed cup 14 of drill 11. A lower end 19 mounts the existing primary seed delivery tube 13.

The insert includes an open interior bore 20 for receiving seeds directly from the hopper and seed cup and for allowing the seed to pass therethrough into the seed delivery tube 13. This represents a normal, primary flow path that exists conventionally without the addition of the present attachment 10. Internal components of the present attachment provide for selective frictional division of seed flowing from the hopper between the primary flow path along the seed delivery tube 13 and a secondary flow path along a secondary guide means 40 as will be described in greater detail below.

A seed deflector means 24 is situated within the hollow insert 18. Deflector means 24 is provided for temporarily angularly deflecting seed passing through the hollow insert. This temporary angular deflection may be described as a somewhat sharp bump or angular area along the otherwise relatively straight primary seed flow path, as shown by the arrow A in FIG. 3.

The seed deflector means 24 may include a disk 25 (FIGS. 3 and 7) positioned within the open bore 20 of the insert. The disk 25 includes a deflector bore 26 angularly situated in relation to the relatively straight axial bore 20, and a by-pass bore 27. The angle of the deflector bore 26 determines the angle of temporary deflection for the seed otherwise moving along the primary flow path. This angle, in relation to primary flow path, is preferably 15° as shown in FIG. 3.

The deflector bore 26 and by-pass bore 27 are both open at opposite ends within the bore 20 of the insert and both are adapted to receive and direct seed received from the hopper and seed cup.

A valve means 29 (FIGS. 3-6) is situated within the hollow insert and is selectively operable therein to direct seed flow either to the deflector bore 26 or the by-pass bore 27. The valve means 29 comprises a substantially cylindrical fitting within the insert bore 20 that is rotatable about the central axis of the insert bore. An angular bore 30 is formed axially through the fitting to selectively communicate, depending upon the valve position, with either the deflector bore 26 or the by-pass bore 27 of deflector means 24. Alternate positions of the valve are illustrated in FIGS. 3 and 4, which correspond respectfully with positions shown in FIGS. 5 and 6. In FIGS. 3 and 5, valve means 29 is positioned to align the bore 30 with the deflector bore 26. In FIGS. 4 and 6, the valve bore 30 is positioned in open communication with the by-pass bore 27. These relative positions, as will be seen below, determine the functional nature of the present attachment.

A lock means 31 is provided between the valve means and hollow insert 18 to selectively lock the valve in either of the positions illustrated in FIG. 3 or 4. The lock means may be simply comprised of a slot and set screw arrangement as may be understood from FIGS. 5 and 6.

An important element of the present attachment is a seed interceptor means 32 mounted on the hollow insert to project into the flow path of seeds temporarily deflected through the deflector bore 26. Means 32 is provided for intercepting a prescribed percentage of the seed flow and directing the intercepted seed away from the primary seed flow path.

The seed interceptor means 32 may be comprised of a tube 34 adjustably positioned at a selected angle in relation to the central axis of the insert 18 and with an open inner end 35 situated within the insert bore 20.

The particular angle of the tube 34, as found by experimentation, is within a range between 25° and 45°, and preferably at 35° as indicated in FIG. 3. This angle is preferred in connection with the desired temporary angle of seed deflection through the deflector means 24 of 15° in relation to the primary seed flow path (which is coincidental with or parallel to the axis of the insert bore 20). The angles described are important for proper operation of the present attachment over various terrain conditions wherein the drill can be disposed at a variety of angular orientations according to ground slope and direction of the seed drill as it is pulled along.

The tube 34 includes an annular end edge 36 at the inner end 35. Edge 36 is formed on a plane that is transverse to the central tube axis. Therefore, the open end 35 will present a constant circular opening at the prescribed angular orientation within the insert bore 20 regardless of the rotational position of the tube about its central axis.

The tube includes a central bore 37 opening at the inner end 35 and extending axially to open at a bottom end 38. This bore 37 defines the secondary seed flow path divergent from the primary flow path through the insert 18 and into the seed delivery tube 13. A secondary delivery tube 39 (FIG. 1) may be provided as secondary guide means on the interceptor means 32 for receiving intercepted seed and directing the seed along the secondary flow path divergent from the primary flow path. The tube 39 may be attached to a dispensing boot 41 that can be mounted to existing structure of the seed drill 11. The differential elevation of the boot 41 and existing boot 15 can be selectively adjusted by appropriate releasable clamping mechanisms that are generally available, such as hose clamps or the like. A selected elevational difference between the secondary boot 41 and seed drill boot 15 is illustrated in FIG. 1.

An adjusting means 42 is provided as shown in FIGS. 2 and 3 for selectively positioning the tube 34 within the hollow insert in order to correspondingly vary the amount of seed intercepted by the tube and directed along the secondary flow path. The adjusting means 42 may be comprised of mating male and female threads 43 (FIG. 3) on the insert 18 and tube 34. Rotation of the tube about its central axis will therefore result in axial motion of the in tube end 35 within the insert bore 20 and in relation to the deflected seed flow path through deflector bore 26. Adjustment of the tube inwardly will result in progressively more seed being intercepted by the tube and directed through the secondary flow path, while turning the tube axially outward will result in progressively less seed being directed through the tube.

A gauge means 45 is provided between the tube 34 and hollow insert 18 in order to indicate the selected percentage of seed intercepted by the tube and directed through the secondary flow path. A set of marks 46 can be provided along the tube length and associated with an appropriate reference edge or surface 47 on the insert. Distance axially between each mark on the gauge means 45 is set to correspond to the percentage of the total seed flow intercepted and delivered through the tube 34. For example, the adjusting means 42 can be operated to set the tube axially such that the marks indicate 30%. This indicates that 30% of the deflected seed through deflector bore 26 will be intercepted and delivered through the secondary seed delivery tube, while the remaining 70% of the seed is free to pass on through the conventional seed delivery tube 13.

The present attachment is mounted to an existing seed drill 11 simply by detaching the existing seed delivery tubes 13 from their associated seed cups 14 and inserting the present attachment in line. The upper attachment end 19 is mounted to the seed cup 14 and the lower bottom end 19 is attached to the seed delivery tube 13. The secondary delivery tube 39 and secondary boot 41 can then be appropriately attached to the seed drill structure with the boot 41 directly behind the existing boot 15. Elevational differences between the existing boot 15 and the secondary boot is determined at this time. Of course, this distance may vary according to the needs of the particular situation. Once the secondary boot 41 is attached in place, however, both boots can simultaneously be adjusted for operational depth by existing mechanisms normally provided on the seed drill 11.

After installation, the adjusting means 42 is operated to select a desired amount of seed flow through the secondary boot 41. An appropriate percentage indication on the gauge means 45 is selected and aligned with the reference 47 by axially turning the tube 34 in or outwardly. This adjustment will then be constantly maintained until further adjustment is made.

The valve means 29 can be operated selectively by the implement operator periodically throughout the seeding process. Typically, acreage being seeded will have a varying contour and, as such, some areas will not require seeding at two selected levels. Others, particularly hillsides, will preferably be seeded at two levels in order to assure growth notwithstanding weather conditions.

When single level planting is desired, the implement operator can simply shift the valve means 29 so the valve bore 30 will direct all seed flow through the by-pass bore 27. One hundred percent of the seed flowing from the hopper through the insert 18 will then be directed past the interceptor means 32 and continues flowing on down the delivery tube 13 to the boot 15. Subsequently, when two level planting is desired, the implement operator can simply turn the valve means 29 to bring the valve bore 30 into alignment with the deflector bore 26. The result is that primary seed flow is momentarily deflected past the opening of the interceptor tube 34. Depending upon the axial position of tube 34, a prescribed percentage of the temporarily deflected seed will be intercepted by the open tube end 35 and directed to the secondary flow path diverging from the primary path. The selected percentage will then be delivered at one selected seeding level through boot 41, while the remaining seed will be discharged through the existing seed boot 15. The percentage delivered through the secondary flow path will be appropriately indicated by the gauge means 45.

The valve means 29 can be operated again upon completion of seeding a selected area at the two different elevations. The valve can then be rotated to shift 100% of the seed flow back through the by-pass bore 27 and into the existing seed delivery tube.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims, appropriately interpreted in accordance with the doctrine of equivalents.

I claim:

1. A seed flow divider attachment for a seed drill having a primary seed delivery tube for receiving seed from a seed hopper and guiding the seed along a primary flow path to a discharge, the attachment comprising:

a hollow insert having a central open bore extending between open ends, mountable to the seed drill such that the seeds flowing along the primary flow path will pass through the open central bore;

deflector means within the hollow insert for angularly deflecting seed passing through the hollow insert through a prescribed angle of deflection;

seed interceptor means mounted to the hollow insert adjacent the deflector means to intercept a prescribed percentage of seed deflected by the deflector means and direct the intercepted seed to a secondary flow path divergent from the primary seed flow path;

wherein the seed interceptor means includes a tube for receiving and guiding interceptor seed from the primary flow; and adjusting means for selectively positioning the tube within the hollow insert to correspondingly vary the amount of seed intercepted thereby and directed to the secondary flow path.

2. The seed flow divider attachment as claimed by claim 1 further comprising valve means mounted to the hollow insert for selectively diverting seed flow within the hollow insert, away from the seed interceptor means, thereby causing the seed to bypass the interceptor means.

3. The seed flow divider attachment as claimed by claim 1 wherein the adjusting means mounts the tube to the hollow insert for axial movement into and out of the open central insert bore, along a prescribed axis and at a prescribed acute angle to the primary seed flow path.

4. The seed flow divider attachment as claimed by claim 3 wherein the prescribed acute angle is in the range of 35° to 45°.

5. The seed flow divider attachment as claimed by claim 3 wherein the acute angle of the tube is 35° from the primary seed flow path.

6. The seed flow divider attachment as claimed by claim 1 further comprising:

valve means within the hollow insert for alternatively controlling seed flow to the deflector means or to bypass the interceptor means so flow will continue along the primary flow path to the discharge of the primary seed delivery tube; and wherein the tube of the seed interceptor means is formed along a fixed central tube axis and mounted to the hollow insert with an open end projecting into the hollow bore thereof adjacent to and downstream of the deflector means.

7. The seed flow divider attachment as claimed by claim 6 wherein the fixed central tube axis is oriented at an acute angle to the primary seed flow path in the range of 25° to 45°.

8. The seed flow divider attachment as claimed by claim 1 wherein the prescribed angle of deflection is 15° from the primary seed flow path.

9. The seed flow divider attachment as claimed by claim 6 wherein the prescribed angle of deflection is 15° from the primary seed flow path.

10. The seed flow divider attachment as claimed by claim 1 wherein the tube includes an open inner end projecting into the hollow bore of the insert, said inner end being defined by an annular end edge formed on a plane transverse to the tube.

11. The seed flow divider attachment as claimed by claim 1 wherein the adjusting means is comprised of mating threads on the tube and hollow body, formed axially along the tube axis.

12. The seed flow divider attachment as claimed by claim 11 further comprising:
   gauge means situated between the tube and hollow insert for indicating a percentage of the primary seed flow intercepted thereby from the primary seed flow.

13. The seed flow divider attachment as claimed by claim 12 further comprising:
   valve means within the hollow insert for selectively controlling seed flow to the deflector means.

14. The seed flow divider attachment as claimed by claim 13 wherein the deflector means includes a deflector bore within the hollow insert and angled to deflect seed past the interceptor means and a bypass bore within the hollow insert and spaced from the interceptor means to direct seed past the interceptor means; and
   wherein the valve means is movable within the hollow insert between a position wherein seed is directed to the deflector bore and a position wherein seed is directed through the bypass bore.

15. A seed flow divider attachment for a seed drill having a primary seed delivery tube for receiving seed from a seed hopper and guiding the seed along a primary flow path to a discharge, the attachment comprising:
   a hollow insert having a central open bore extending between open ends, mountable to the seed drill such that seeds flowing along the primary flow path will pass through the open central bore;
   deflector means within the hollow insert, including a deflector bore for deflecting seed angularly within the hollow insert and a bypass bore spaced from the deflector bore for receiving and directing seed through the hollow insert along the primary flow path;
   valve means movably mounted within the hollow insert and operable to direct seed flow either to the deflector bore or to the bypass bore;
   seed interceptor means mounted to the hollow insert and adjustably positionable thereon to project into the path of seed deflected by the deflector bore, for intercepting a prescribed percentage of the seed and directing the intercepted seed away from the primary seed flow path; and
   secondary guide means on the interceptor means for receiving seed from the interceptor means and directing the intercepted seed along a secondary flow path divergent from the primary seed flow path and primary seed delivery tube of the seed drill.

16. The seed flow divider attachment as claimed by claim 15 wherein the seed interceptor means includes a tube movably mounted to the hollow insert for axial movement into and out of the open central insert bore, along a prescribed axis and at a prescribed acute angle to the primary seed flow path.

17. The seed flow divider attachment as claimed by claim 16 wherein the tube includes an open inner end projecting into the hollow bore of the insert defined by an annular end edge formed on a plane transverse to the central tube axis.

18. The seed flow divider attachment as claimed by claim 15 wherein the seed interceptor means includes a tube formed along an axis for receiving and guiding intercepted seed from the primary flow; and
   adjusting means for selectively positioning the tube within the hollow insert to correspondingly vary the amount of seed intercepted thereby and directed to the secondary flow path.

19. The seed flow divider attachment as claimed by claim 18 wherein the adjusting means is comprised of mating threads on the tube and hollow body, formed axially along the tube axis.

20. The seed flow divider attachment as claimed by claim 16 further comprising:
   gauge means situated between the tube and hollow insert for indicating a percentage of the primary seed flow intercepted thereby from the primary seed flow.

* * * * *